US012455954B2

(12) United States Patent
Lee et al.

(10) Patent No.: US 12,455,954 B2
(45) Date of Patent: Oct. 28, 2025

(54) APPARATUS AND METHOD FOR AUTHENTICATING USER IN AUGMENTED REALITY

(71) Applicant: Samsung Electronics Co., Ltd., Suwon-si (KR)

(72) Inventors: Gunhee Lee, Suwon-si (KR); Mijeong Song, Suwon-si (KR); Jinmo Kang, Suwon-si (KR); Hyunwoo Kim, Suwon-si (KR); Sungoh Kim, Suwon-si (KR); Chanmin Park, Suwon-si (KR); Donghyun Yeom, Suwon-si (KR); Sanghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 18/356,524

(22) Filed: Jul. 21, 2023

(65) Prior Publication Data
US 2024/0045943 A1 Feb. 8, 2024

Related U.S. Application Data

(63) Continuation of application No. PCT/KR2023/007773, filed on Jun. 7, 2023.

(30) Foreign Application Priority Data

Aug. 3, 2022 (KR) ........................ 10-2022-0096834
Aug. 31, 2022 (KR) ........................ 10-2022-0109857

(51) Int. Cl.
*G06F 21/36* (2013.01)
*G06F 3/01* (2006.01)
(Continued)

(52) U.S. Cl.
CPC .............. *G06F 21/36* (2013.01); *G06F 3/013* (2013.01); *G06F 3/0346* (2013.01); *G06T 7/70* (2017.01);
(Continued)

(58) Field of Classification Search
None
See application file for complete search history.

(56) References Cited

U.S. PATENT DOCUMENTS

| 9,092,600 | B2 | 7/2015 | Scavezze et al. |
| 9,727,211 | B2 | 8/2017 | Ballard et al. |
| 11,227,043 | B2 | 1/2022 | Chung |
| 2014/0125575 | A1* | 5/2014 | Samanta Singhar ... G06F 3/038 345/156 |

(Continued)

FOREIGN PATENT DOCUMENTS

| EP | 3477429 A1 | 5/2019 |
| JP | 2018-181256 A | 11/2018 |

(Continued)

OTHER PUBLICATIONS

International Search Report dated Aug. 25, 2023, issued in International Patent Application No. PCT/KR2023/007773.

*Primary Examiner* — Philip J Chea
*Assistant Examiner* — James Ross Hollister
(74) *Attorney, Agent, or Firm* — Jefferson IP Law, LLP

(57) ABSTRACT

An electronic device is provided. The electronic device obtains current spatial information on a physical space where a user is positioned using a sensor, generates a greater number of virtual objects than the number of unavailable authentication objects based on at least one authentication object among a plurality of authentication objects being unavailable in the current spatial information, outputs the generated virtual objects to a plurality of positions including a physical position of an unavailable authentication object, and determines that authentication is successful based on a (Continued)

user input that selects a generated virtual object and an available authentication object as a registered sequence.

18 Claims, 11 Drawing Sheets

(51) Int. Cl.
  *G06F 3/0346* (2013.01)
  *G06T 7/70* (2017.01)
  *G06T 19/00* (2011.01)
  *G06T 19/20* (2011.01)

(52) U.S. Cl.
  CPC ............ *G06T 19/006* (2013.01); *G06T 19/20* (2013.01); *G06T 2219/2004* (2013.01); *G06T 2219/2021* (2013.01)

(56) References Cited

U.S. PATENT DOCUMENTS

| | | | | |
|---|---|---|---|---|
| 2014/0126782 | A1* | 5/2014 | Takai | G06F 3/013 |
| | | | | 382/116 |
| 2017/0318019 | A1* | 11/2017 | Gordon | G06V 40/67 |
| 2019/0227694 | A1 | 7/2019 | Shin et al. | |
| 2020/0004948 | A1* | 1/2020 | Zhu | G06T 19/006 |
| 2020/0026842 | A1* | 1/2020 | Jain | G06F 21/316 |
| 2020/0117789 | A1* | 4/2020 | Funk | G06F 21/316 |
| 2022/0108000 | A1* | 4/2022 | Wetsel | G06F 21/629 |
| 2022/0382841 | A1* | 12/2022 | Liao | G06V 40/172 |

FOREIGN PATENT DOCUMENTS

| | | |
|---|---|---|
| KR | 102193636 B1 | 12/2020 |
| KR | 10-2312900 B1 | 10/2021 |
| KR | 10-2022-0061377 A | 5/2022 |

* cited by examiner

APPARATUS AND METHOD FOR AUTHENTICATING USER IN AUGMENTED REALITY

CROSS-REFERENCE TO RELATED APPLICATION(S)

This application is a continuation application, claiming priority under § 365(c), of an International application No. PCT/KR2023/007773, filed on Jun. 7, 2023, which is based on and claims the benefit of a Korean patent application number 10-2022-0096834, filed on Aug. 3, 2022, in the Korean Intellectual Property Office, and of a Korean patent application number 10-2022-0109857, filed on Aug. 31, 2022, in the Korean Intellectual Property Office, the disclosure of each of which is incorporated by reference herein in its entirety.

BACKGROUND

1. Field

The disclosure relates to an apparatus and method for authenticating a user in augmented reality.

2. Description of Related Art

With the development of information communication technology and semiconductor technology, various electronic devices are developing into multimedia devices that provide various multimedia services. A multimedia service may include any one or any combination of a voice call service, a message service, a broadcast service, a wireless Internet service, a camera service, an electronic payment service, and a music playback service.

An electronic device may provide experiences to users in various forms. For example, an electronic device may provide users with various types of experiences based on an augmented reality (AR) service in which virtual information (e.g., virtual objects) is added to a real space. An electronic device may perform user authentication in AR.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to an apparatus and method for authenticating a user in augmented reality.

Additional aspects will be set forth in part in the description which follows and, in part, will be apparent from the description, or may be learned by practice of the presented embodiments.

In accordance with an aspect of the disclosure, an electronic device is provided. The electronic device includes a display that provides augmented reality, a sensor that collects information for providing augmented reality, a memory that stores computer-executable instructions, and a processor that executes the instructions by accessing the memory. The instructions may include obtaining current spatial information on a physical space where a user is positioned using a sensor. The instructions may include generating a greater number of virtual objects than the number of unavailable authentication objects based on at least one authentication object among a plurality of authentication objects being unavailable in the current spatial information. The instructions may include outputting the generated virtual objects to a plurality of positions including a physical position of an unavailable authentication object. The instructions may include determining that authentication is successful based on a user input that selects the generated virtual object and an available authentication object as a registered sequence.

In accordance with another aspect of the disclosure, a method implemented by a processor is provided. The method includes obtaining current spatial information on a physical space where a user is positioned using a sensor that collects information for providing augmented reality. The method may include generating a greater number of virtual objects than the number of unavailable authentication objects based on at least one authentication object among a plurality of authentication objects being unavailable in the current spatial information. The method may include outputting the generated virtual objects to a plurality of positions including a physical position of an unavailable authentication object using a display that provides augmented reality. The method may include determining that authentication is successful based on a user input that selects the generated virtual object and an available authentication object as a registered sequence.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
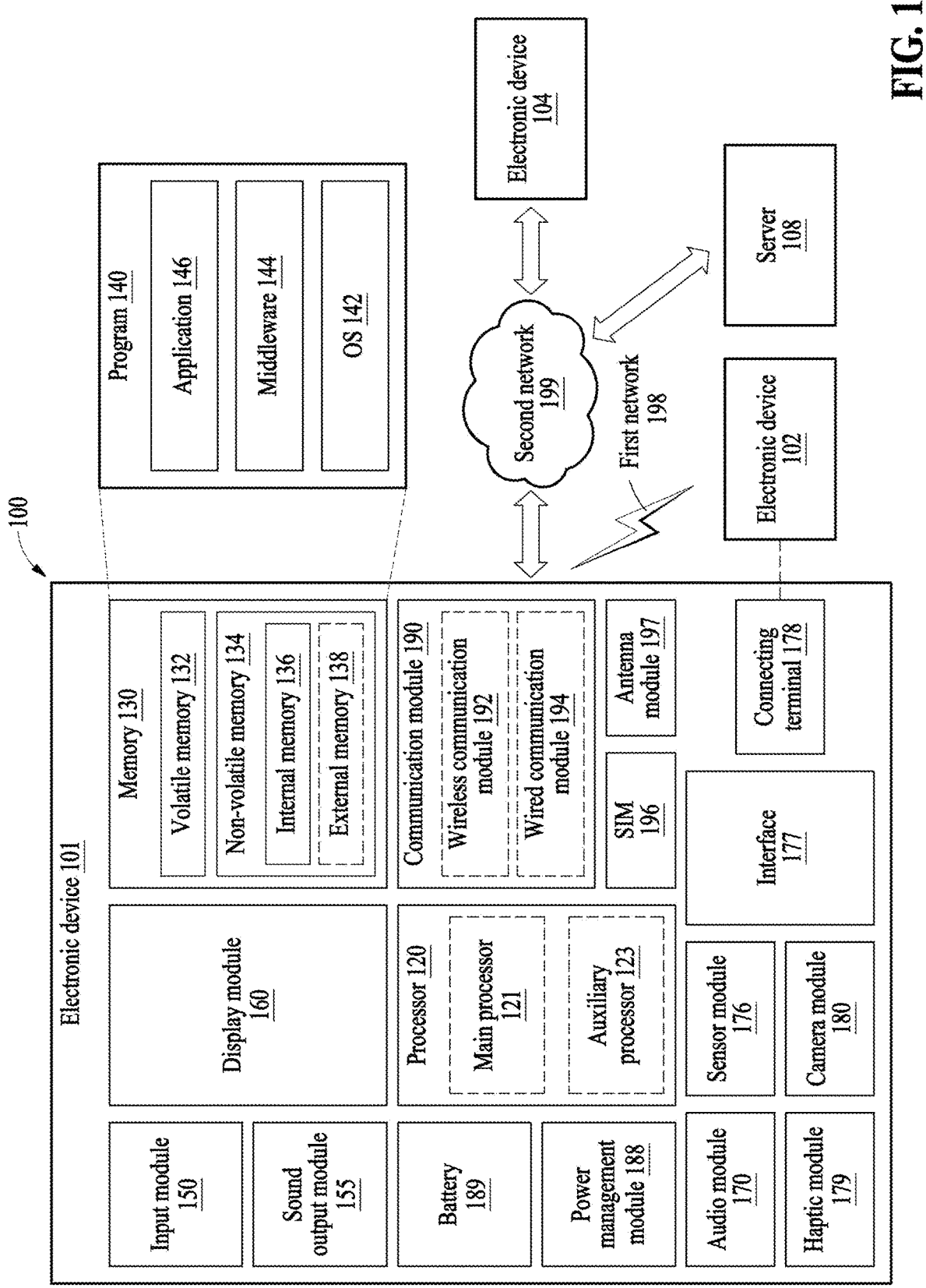
FIG. 1 is a block diagram illustrating a configuration of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one of the components (e.g., the display module 160, the sensor module 176, or the communication module 190) of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may acquire the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, for example, new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter-wave (mmWave) band) to achieve, for example, a high data transmission rate. The wireless communication module 192 may support various technologies for securing performance on a high-frequency band, such as, e.g., beam-forming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibel (dB) or less) for implementing mMTC, or U-plane latency (e.g., 0.5 millisecond (ms) or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer a result of the performing to the electronic device 101. The electronic device 101 may provide the result, with or without further processing of the result, as at least part of a response to the request.

For example, the external electronic device 102 may render content data executed by an application and then transmit the data to the electronic device 101, and the electronic device 101 receiving the data may output the content data to the display module 160. If the electronic device 101 detects a motion of a user through an inertial measurement unit (IMU) sensor, and the like, the processor 120 of the electronic device 101 may correct the rendered data received from the external electronic device 102 based on information on the motion and output the corrected data to the display module 160. Alternatively, the processor may transmit the information on the motion to the external electronic device 102 and send a rendering request such that screen data is updated accordingly. According to an embodiment, the external electronic device 102 may be a device in various forms, such as a smartphone or a case device for storing and charging the electronic device 101.

To that end, cloud computing, distributed computing, mobile edge computing (MEC), or client-server computing technology may be used, for example. The electronic device 101 may provide ultra low-latency services using, for example, distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
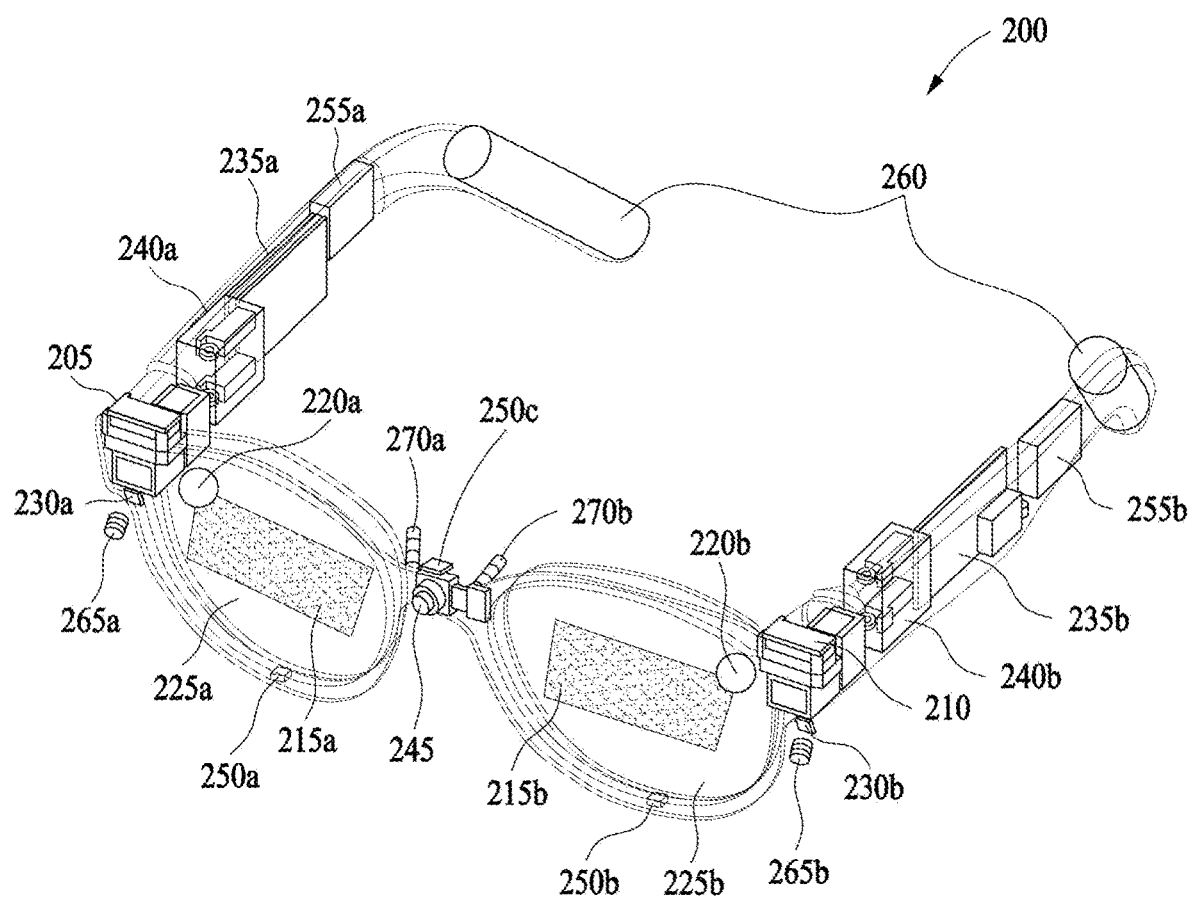
FIG. 2 is a diagram illustrating a structure of an electronic device according to an embodiment of the disclosure.

FIG. 2 is a diagram illustrating a structure of an electronic device according to an embodiment of the disclosure.

Referring to FIG. 2, a wearable electronic device 200 (e.g., the electronic device 101 or 102 of FIG. 1) may be worn on a face of a user to provide the user with an image associated with an augmented reality (AR) service and/or a virtual reality (VR) service.

In an embodiment, the wearable electronic device 200 may include a first display 205, a second display 210, screen display portions 215a and 215b, input optical members 220a and 220b, a first transparent member 225a, a second transparent member 225b, lighting units 230a and 230b, a first PCB 235a, a second PCB 235b, a first hinge 240a, a second hinge 240b, an imaging camera 245, a plurality of microphones (e.g., a first microphone 250a, a second microphone 250b, and a third microphone 250c), a plurality of speakers (e.g., a first speaker 255a and a second speaker 255b), a battery 260, a first recognition camera 265a, a second recognition camera 265b, a first eye tracking camera 270a, and a second eye tracking camera 270b.

In an embodiment, a display (e.g., the first display 205 and the second display 210) may include, for example, a liquid crystal display (LCD), a digital mirror device (DMD), a liquid crystal on silicon (LCoS), an organic light-emitting diode (OLED), or a micro light-emitting diode (micro LED). Although not shown in the drawings, when the first display 205 and/or the second display 210 is one of an LCD, a DMD, or a LCoS, the wearable electronic device 200 may include a light source which emits light to a screen output area of the first display 205 and/or the second display 210. In an embodiment, when the first display 205 and/or the second display 210 is capable of generating light by itself (when the first display 205 and/or the second display 210 is either an OLED or a micro-LED, for example), the wearable electronic device 200 may provide a virtual image with a relatively high quality to the user even though a separate light source is not included. For example, when the first display 205 and/or the second display 210 is implemented as an OLED or a micro-LED, a light source may be unnecessary, and accordingly the wearable electronic device 200 may be lightened. Hereinafter, the first display 205 and/or the second display 210 capable of generating light by itself may be referred to as a "self-luminous display," and description will be made on the assumption of the self-luminous display.

The first display 205 and/or the second display 210 according to an embodiment may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 µm or less). Accordingly, it may be possible to provide a high resolution without a backlight unit (BLU), when the first display 205 and/or the second display 210 is implemented as a micro-LED. However, the embodiments are not limited thereto, and a single chip may be implemented by a plurality of pixels including R, G, and B pixels. The first display 205 and/or the second display 210 may also be referred to as a "light source."

In an embodiment, the first display 205 and/or the second display 210 may include pixels for displaying a virtual image. The first display 205 and/or the second display 210 may further include infrared pixels that emit infrared light.

In an embodiment, the first display 205 and/or the second display 210 may further include light-receiving pixels (e.g., photo sensor pixels) that are disposed between pixels, receive light reflected from eyes of a user, convert the received light to electrical energy, and output the electrical energy. A light-receiving pixel(s) may be referred to as an "eye tracking sensor." The eye tracking sensor (e.g., an eye tracking sensor 315 of FIG. 3) may sense infrared light generated by reflecting light emitted by an infrared pixel included in the first display 205 and/or the second display 210 by eyes of a user.

The wearable electronic device 200 may detect a gaze direction (e.g., a movement of a pupil) of the user, using light-receiving pixels (e.g., eye tracking sensor 315). For example, the wearable electronic device 200 may detect and track a gaze direction of each of a right eye and a left eye of the user through one or more light-receiving pixels (e.g., eye tracking sensor 315) of the first display 205 and one or more light-receiving pixels (e.g., eye tracking sensor 315) of the second display 210. The wearable electronic device 200 may also determine a central position of a virtual image according to the gaze directions of the right eye and the left eye of the user (e.g., directions in which pupils of the right eye and the left eye of the user gaze) detected through the one or more light-receiving pixels (e.g., eye tracking sensor 315).

The wearable electronic device 200 may include the first display 205 and/or the second display 210, the first transparent member 225a and/or the second transparent member 225b. A user may use the wearable electronic device 200 while wearing the wearable electronic device 200 on a face of the user. In an embodiment, the first transparent member 225a may face the right eye of the user, and the second transparent member 225b may face the left eye of the user. In an embodiment, when the first display 205 and/or the second display 210 are transparent, the first display 205 and/or the second display 210 may face the eyes of the user to configure the screen display portions 215a and 215b.

The first display 205 and the second display 210 may each include a first control circuit (not shown). The first control circuit may control the first display 205 and the second display 210. The first control circuit may control an operation of a liquid crystal element of a transparent cover (not shown) included in each of the first display 205 and the second display 210. In an embodiment, light emitted from the first display 205 and/or the second display 210 may reach the screen display portion 215a formed on the first transparent member 225a that faces the right eye of the user, and the screen display portion 215b formed on the second transparent member 225b that faces the left eye of the user, by passing through a lens (not shown) and a waveguide (e.g., a display waveguide 350 and an eye tracking waveguide 360 of FIG. 3).

The lens (not shown) may be disposed in front of the first display 205 and/or the second display 210. The lens (not shown) may include a concave lens and/or a convex lens. For example, the lens (not shown) may include a projection lens (e.g., a projection lens 325 of FIG. 3), or a collimation lens (not shown).

In an embodiment, the light emitted from the first display 205 and/or the second display 210 may be guided by the display waveguide 350 and/or the eye tracking waveguide 360 through the input optical members 220a and 220b. Light moving into the display waveguide 350 and/or the eye tracking waveguide 360 may be guided toward eyes of a user through an output optical member (e.g., an output optical member 340 of FIG. 3). The screen display portions 215a and 215b may be determined based on light emitted toward an eye of a user (e.g., an eye 301 of the user of FIG. 3).

For example, the light emitted from the first display 205 and/or the second display 210 may be reflected from a grating area of the display waveguide 350 and/or the eye tracking waveguide 360 formed in the input optical member 220a, 220b and the screen display portion 215a, 215b, and may be transmitted to the eye 301 of the user.

In an embodiment, the screen display portions 215a and 215b or a transparent member (e.g., the first transparent member 225a and the second transparent member 225b) may include a reflective lens, and a lens including the display waveguide 350 and/or the eye tracking waveguide 360. The display waveguide 350 and the eye tracking waveguide 360 may function to transmit a light source generated by the first display 205 and/or the second display 210 to eyes of the user, and may be referred to as an "optical waveguide." Hereinafter, an "optical waveguide" or "wave guide" may correspond to the screen display portions 215a and 215b.

The screen display portions 215a and 215b may be a path through which external light is incident, totally reflected, and emitted, and may be distinguished from the first transparent member 225a and the second transparent member 225b through which external light is simply reflected or transmitted.

In an embodiment, the screen display portions 215a and 215b may include glass, plastic, or a polymer, and may have a nanopattern formed on one surface of the inside or outside, that is, a grating structure of a polygonal or curved shape. In an embodiment, light incident to one end of the screen display portions 215a and 215b through the input optical members 220a and 220b may be propagated inside the display waveguide 350 by the nanopattern to be provided to the user. For example, the screen display portions 215a and 215b including a freeform prism may provide incident light to a user through a reflection mirror.

The screen display portions 215a and 215b may include at least one of a reflective element (e.g., a reflection mirror) and at least one diffractive element (e.g., a diffractive optical element (DOE) or a holographic optical element (HOE)). The screen display portions 215a and 215b may guide light emitted from a display (e.g., the first display 205 and the second display 210) to the eyes of the user, using the at least one diffractive element or the reflective element included in the screen display portions 215a and 215b.

Figure 3:
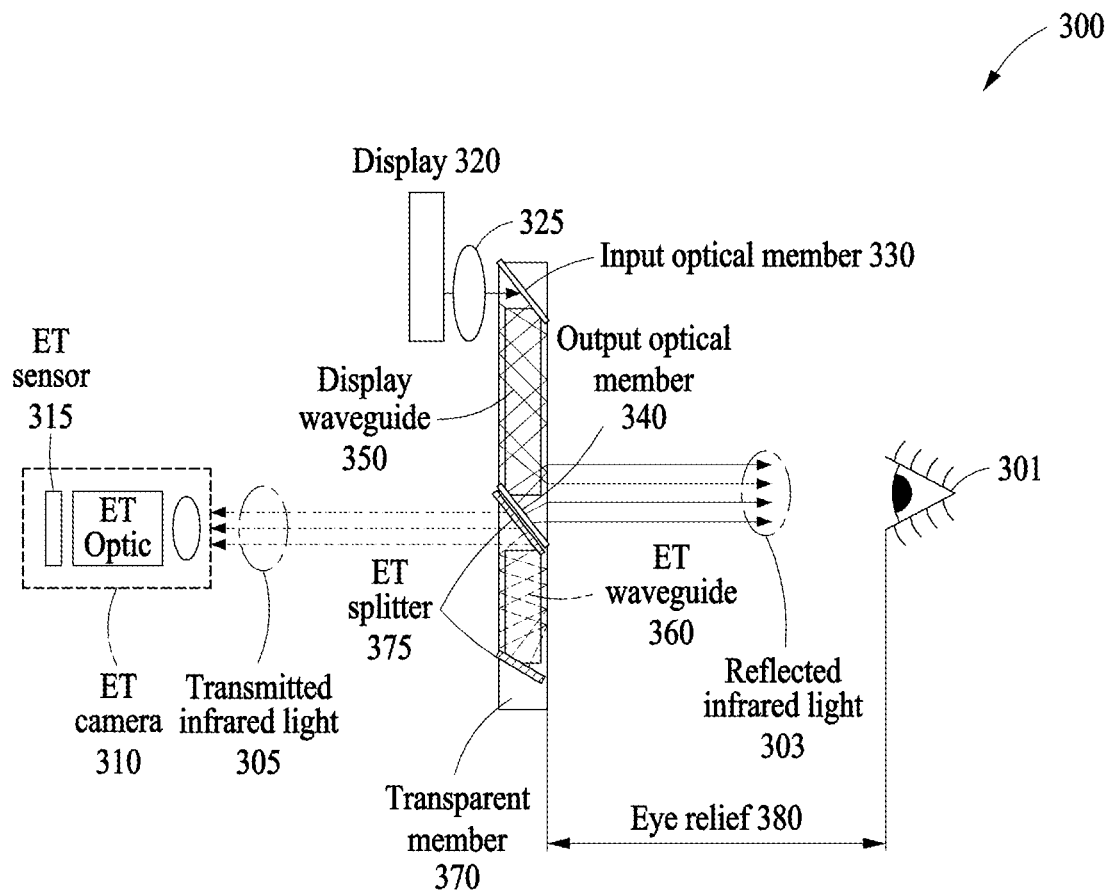
FIG. 3 is a diagram illustrating an operation of an eye tracking camera included in an electronic device according to an embodiment of the disclosure.

In an embodiment, the diffractive element may include the input optical members 220a and 220b and/or an output optical member (e.g., the output optical member 340 of FIG. 3). For example, the input optical members 220a and 220b may refer to an input grating area, and the output optical member 340 may refer to an output grating area. The input grating area may function as an input terminal to diffract (or reflect) light output from the first display 205 and/or the second display 210 (e.g., a micro LED) to transmit the light to the screen display portions 215a and 215b. The output grating area may function as an exit to diffract (or reflect) light transmitted to the display waveguide 350 and/or the eye tracking waveguide 360 to the eye 301 of the user.

In an embodiment, the reflective element may include a total internal reflection optical element or a total internal reflection waveguide for total internal reflection (TIR). For example, total reflection, which is one of schemes of inducing light, may define an angle of incidence such that light (e.g., a virtual image) entering through the input grating area is completely or almost completely reflected from a portion (e.g., a predetermined surface) of the screen display portions 215a and 215b, to completely or almost completely transmit the light to the output grating area.

The first transparent member 225a and/or the second transparent member 225b may be formed as a glass plate, a plastic plate, or a polymer, and may be transparently or translucently formed, for example. In an embodiment, the first transparent member 225a may face the right eye of the user, and the second transparent member 225b may face the left eye of the user.

The lighting units 230a and 230b may be used differently according to positions in which the lighting units 230a and 230b are attached. For example, the lighting units 230a and 230b may be attached around a frame of the wearable electronic device 200. The lighting units 230a and 230b may be used as auxiliary devices for facilitating eye-gaze detection when pupils are captured using the first eye tracking camera 270a and the second eye tracking camera 270b. The lighting units 230a and 230b may use an IR LED with a visible light wavelength or an infrared light wavelength.

Alternatively, the lighting units 230a and 230b may be attached around a hinge (e.g., the first hinge 240a and the second hinge 240b) that connects a frame (e.g., a rim) and a temple corresponding to a leg portion of glasses of the wearable electronic device 200 or around a camera (e.g., the first recognition camera 265a and the second recognition camera 265b) mounted adjacent to a bridge that connects the frame. Here, the first recognition camera 265a and the second recognition camera 265b may be, for example, global shutter (GS) cameras, but are not limited thereto.

When capturing is performed using a GS camera, the lighting units 230a and 230b may be used to supplement a surrounding brightness. For example, the lighting units 230a and 230b may be used in a dark environment or when it is not easy to detect a subject to be captured due to reflected light and mixing of various light sources.

In an embodiment, the lighting units 230a and 230b may be omitted. The lighting units 230a and 230b may be replaced by infrared pixels included in the first display 205 and the second display 210. In an embodiment, the lighting units 230a and 230b may be included in the wearable electronic device 200 to assist infrared pixels included in the first display 205 and the second display 210.

A PCB (e.g., the first PCB 235a and the second PCB 235b) may be disposed in the temple portion of the wearable electronic device 200 and may transmit an electrical signal to each module (e.g., a camera, a display, an audio, or a sensor) and another PCB through a flexible printed circuit board (FPCB). In an embodiment, at least one PCB may include the first PCB 235a, the second PCB 235b, and an interposer (not shown) disposed between the first PCB 235a and the second PCB 235b.

In an embodiment, a control circuit (not shown) for controlling components of the wearable electronic device 200 other than the first display 205 and the second display 210 may be disposed on a PCB (e.g., the first PCB 235a and the second PCB 235b). The control circuit may control components other than the first display 205 and the second display 210 and perform an operation such as depth value estimation. The control circuit may include a communication circuit (e.g., the communication module 190 of FIG. 1) or a memory (e.g., the memory 130 of FIG. 1). The control circuit may control the first display 205, the second display 210, and/or the other components.

The first hinge 240a and/or the second hinge 240b may correspond to a portion where the temple and the frame (e.g., the rim) of the wearable electronic device 200 are coupled.

In an embodiment, the imaging camera 245 may be referred to as a "high resolution (HR)" or a "photo video (PV)," and may include a high-resolution camera. The imaging camera 245 may include a color camera having functions for obtaining a high-quality image, such as an automatic focus (AF) function and an optical image stabilizer (OIS). The embodiments are not limited thereto, and the imaging camera 245 may include a GS camera or a rolling shutter (RS) camera.

In an embodiment, a plurality of microphones (e.g., the first microphone 250a, the second microphone 250b, and the third microphone 250c) may convert an external acoustic signal into electrical audio data. The electrical audio data may be variously utilized according to a function (or an application being executed) being performed by the wearable electronic device 200.

In an embodiment, a plurality of speakers (e.g., the first speaker 255a and the second speaker 255b) may output audio data that is received from a communication circuit (e.g., the communication module 190 of FIG. 1) or stored in a memory (e.g., the memory 130 of FIG. 1).

In an embodiment, one or more batteries 260 may be included, and may supply power to components constituting the wearable electronic device 200.

In an embodiment, the first recognition camera 265a and the second recognition camera 265b may include cameras used for three degrees of freedom (3DoF) and six degrees of freedom (6DoF) head tracking, hand detection and tracking, and gesture and/or space recognition. For example, the first recognition camera 265a and the second recognition camera 265b may each include a GS camera to detect a movement of a head or a hand and track the movement. For example, a stereo camera may be used for head tracking and space recognition, and accordingly two GS cameras with the same standard and performance may be used. An RS camera may be used to detect a quick hand movement and a minute movement of a finger and track a movement. In an embodiment, a GS camera having superior performance (e.g., image drag) in comparison to a camera may be mainly used, however, the embodiments are not limited thereto. In an embodiment, an RS camera may also be used. The first recognition camera 265a and the second recognition camera 265b may perform a simultaneous localization and mapping (SLAM) function through depth capturing and spatial recognition for 6DoF. In addition, the first recognition camera 265a and the second recognition camera 265b may perform a user gesture recognition function.

In an embodiment, at least one sensor (not shown, e.g., a gyro sensor, an acceleration sensor, a geomagnetic sensor, and/or a gesture sensor), the first recognition camera 265a, and the second recognition camera 265b may perform at least one of head tracking for 6DoF, pose estimation and prediction, gesture and/or space recognition, and/or a function of a SLAM through depth imaging.

In an embodiment, the first recognition camera 265a and the second recognition camera 265b may be classified and used as a camera for head tracking and a camera for hand tracking.

In an embodiment, the first eye tracking camera 270a and the second eye tracking camera 270b may detect and track pupils. The first eye tracking camera 270a and the second eye tracking camera 270b may be used to allow a center of a virtual image projected onto the wearable electronic device 200 to be disposed based on a direction in which a pupil of a user wearing the wearable electronic device 200 gazes. For example, as the first eye tracking camera 270a and the second eye tracking camera 270b, a GS camera may be mainly used to detect a pupil and track a fast pupil movement. The first eye tracking camera 270a may be installed to correspond to the right eye of the user, and the second eye tracking camera 270b may be installed to correspond to the left eye of the user. Here, the first eye tracking camera 270a and the second eye tracking camera 270b may have the same camera performance and specifications, however, the embodiments are not limited thereto. An operation of an eye tracking camera (e.g., the first eye tracking camera 270a and the second eye tracking camera 270b) will be described in more detail below with reference to FIG. 3.

FIG. 3 is a diagram illustrating an operation of an eye tracking camera included in an electronic device according to an embodiment of the disclosure.

Referring to FIG. 3, FIG. 3 illustrates a process in which an eye tracking camera 310 (e.g., the first eye tracking camera 270a and the second eye tracking camera 270b of FIG. 2) of a wearable electronic device 300 according to an embodiment tracks the eye 301 of the user, that is, a gaze of the user, using light (e.g., infrared light) output from a display 320 (e.g., the first display 205 and the second display 210 of FIG. 2).

The eye tracking camera 310 may include the eye tracking sensor 315. The eye tracking sensor 315 may be included inside the eye tracking camera 310. The eye tracking sensor 315 may detect first reflected light that is generated when reflected infrared light 303 is reflected from the eye 301 of the user. The eye tracking camera 310 may track the eye 301 of the user, that is, the gaze of the user, based on a detection result of the eye tracking sensor 315.

The display 320 may include a plurality of visible light pixels and a plurality of infrared pixels. The visible light pixels may include R, G, and B pixels. The visible light pixels may output visible light corresponding to a virtual object image. The infrared pixels may output infrared light. The display 320 may include, for example, micro LEDs, or OLEDs.

The wearable electronic device 300 may perform gaze tracking using the infrared light output from the display 320. The projection lens 325 may be disposed between the display 320 and an input optical member 330 (e.g., the input optical members 220a and 220b of FIG. 2).

The infrared light output from the display 320 may be incident on the input optical member 330 through the projection lens 325, and may be separated into the reflected infrared light 303 and transmitted infrared light 305 by a half mirror (not shown) included in the input optical member 330.

The half mirror may be formed in the entire area or a partial area of the input optical member 330. When the half mirror is formed in the entire area of the input optical member 330, the input optical member 330 may also be referred to as a "half mirror." The half mirror may be disposed in the input optical member 330 of the display waveguide 350. The half mirror may be disposed inside or below the input optical member 330. The half mirror may include a grating structure.

The half mirror may output reflected infrared light and transmitted infrared light in response to the infrared light output from the display 320. The half mirror may include a grating structure. The grating structure may output reflected infrared light directed toward the eye 301 of the user by reflecting a portion of the output infrared light, or may output the reflected infrared light 303 toward the eye 301 of the user through the output optical member 340 by passing through the display waveguide 350. Also, the grating structure may output the transmitted infrared light 305 by transmitting another portion of the output infrared light.

The reflected infrared light 303 may be output directly toward the eye 301 of the user. The reflected infrared light 303 may be output toward the eye 301 of the user through the output optical member 340 by passing through the display waveguide 350. The transmitted infrared light 305 may be output toward the real world. The transmitted infrared light 305 may be incident on the real object and may be partially reflected from the real object.

The display waveguide 350 and the eye tracking waveguide 360 may be included in a transparent member 370 (e.g., the first transparent member 225a and the second transparent member 225b of FIG. 2). The transparent member 370 may be formed as, for example, a glass plate, a plastic plate, or a polymer, and may be transparently or translucently formed. The transparent member 370 may face an eye of a user. In this case, a distance between the transparent member 370 and the eye 301 may be referred to as an "eye relief" 380.

The transparent member 370 may include the display waveguide 350 and the eye tracking waveguide 360. The transparent member 370 may include the input optical member 330 and the output optical member 340. In addition, the transparent member 370 may include an eye tracking splitter 375 that splits the input light into several waveguides.

The display waveguide 350 is separated from the input optical member 330 as shown in FIG. 3, however, this is merely an example. The input optical member 330 may also be included in the display waveguide 350.

In addition, the output optical member 340 is separated from the eye tracking waveguide 360, as shown in FIG. 3, however, this is merely an example. The output optical member 340 may also be included in the eye tracking waveguide 360.

An optical waveguide (e.g., the display waveguide 350 and the eye tracking waveguide 360) may output a virtual object image by adjusting a path of visible light. Visible light and infrared light output from the display 320 may be incident on the input optical member 330 through the projection lens 325. Visible light among light incident on the input optical member 330 may be totally reflected through the display waveguide 350 to be guided to the output optical member 340. The visible light may be output from the output optical member 340 toward the eye 301 of the user.

The wearable electronic device 300 may reflect or transmit the infrared light output from the display 320 through the half mirror. In an embodiment, the wearable electronic device 300 may output the reflected infrared light 303 that is reflected by the half mirror (not shown) directly toward the eye 301 of the user, or may output the reflected infrared light 303 passing through the display waveguide 350 toward the eye 301 of the user. In an embodiment, the wearable electronic device 300 may output the transmitted infrared light 305 passing through the half mirror toward the real object. A reflectivity and a transmittance of the half mirror may be adjusted. For example, the half mirror may have a reflectivity of 30% (e.g., reflection toward eyes of a user) and a transmittance of 70% (e.g., output toward a real object) with respect to infrared light. However, the reflectivity and the transmittance are merely examples and may be adjusted in various ratios.

In an embodiment, the wearable electronic device 300 may output the reflected infrared light 303 toward eyes of the user through the half mirror and the infrared pixels included in the display 320. The reflected infrared light 303 may be reflected from the eye 301 of the user, and the eye tracking sensor 315 may detect the reflected light. The display 320 including the infrared pixels, and the half mirror included in the display waveguide 350 may be used instead of a separate infrared light source for detecting a real object. Since the separate infrared light source is not used, the wearable electronic device 300 may be lightened and power consumption may be reduced. In addition, the display 320 including the infrared pixels may function as an auxiliary light source to increase an image quality of a stereo camera (e.g., the first recognition camera 265a and the second recognition camera 265b of FIG. 2) in a low-illuminance environment and increase an accuracy of depth information.

Alternatively, the wearable electronic device 300 may output infrared light through the display 320 and detect light reflected from the real object through a stereo camera (e.g., the first recognition camera 265a and the second recognition camera 265b of FIG. 2). The wearable electronic device 300 may estimate a distance to the real object based on a detection result. For example, the wearable electronic device 300 may measure a depth value or use a time of flight (ToF) scheme to estimate the distance to the real object.

The wearable electronic device 300 (e.g., the wearable electronic device 200 of FIG. 2) may provide AR to a user. The wearable electronic device 300 may provide an image representing the real world through the transparent eye tracking waveguide 360, while transferring a virtual object image output from the display 320 toward eyes of the user through the display waveguide 350.

The wearable electronic device 300 may include, but is not limited to, for example, a head-mounted display (HMD), a face-mounted display (FMD), or smart glasses (e.g., AR glasses) or a headset that provides extended reality such as AR, VR, or mixed reality.

In an embodiment, the wearable electronic device 300 may output infrared light using the display 320 including the infrared pixels. The wearable electronic device 300 may track a gaze of a user, using the infrared light output from the display 320. In addition, the wearable electronic device 300 may estimate a distance to a real object, using the infrared light output from the display 320.

The electronic device according to an embodiment may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be understood that an embodiment of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the items, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "$1^{st}$", "$2^{nd}$" or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment, an electronic device may register an authentication sequence in a physical space and perform user authentication based on whether authentication objects are selected in the physical space according to the registered authentication sequence. The authentication sequence may be a sequence in which authentication objects are selected for user authentication. The authentication sequence may be registered for an authority related to at least one of a physical space or an electronic device. The authentication sequence may be registered for at least one of information (e.g., information indicating a virtual background, a virtual space that augments a physical space) mapped to and stored in a physical space, a device placed in the physical space, and a device connected to an electronic device in the physical space. For example, when the electronic device determines that user authentication for the physical space is successful, the electronic device may allow the corresponding user control authority of a device placed in the corresponding physical space. As another example, based on successful user authentication, the electronic device may grant access to information (e.g., content mapped to the corresponding space by the user or content set to be viewed only in the corresponding space) available in the corresponding physical space to the user.

Hereinafter, FIGS. 4 and 5 describe a user authentication operation based on matching between a registered authentication sequence and an input authentication sequence, and FIG. 11 describes the registration of an authentication sequence.

Figure 4:
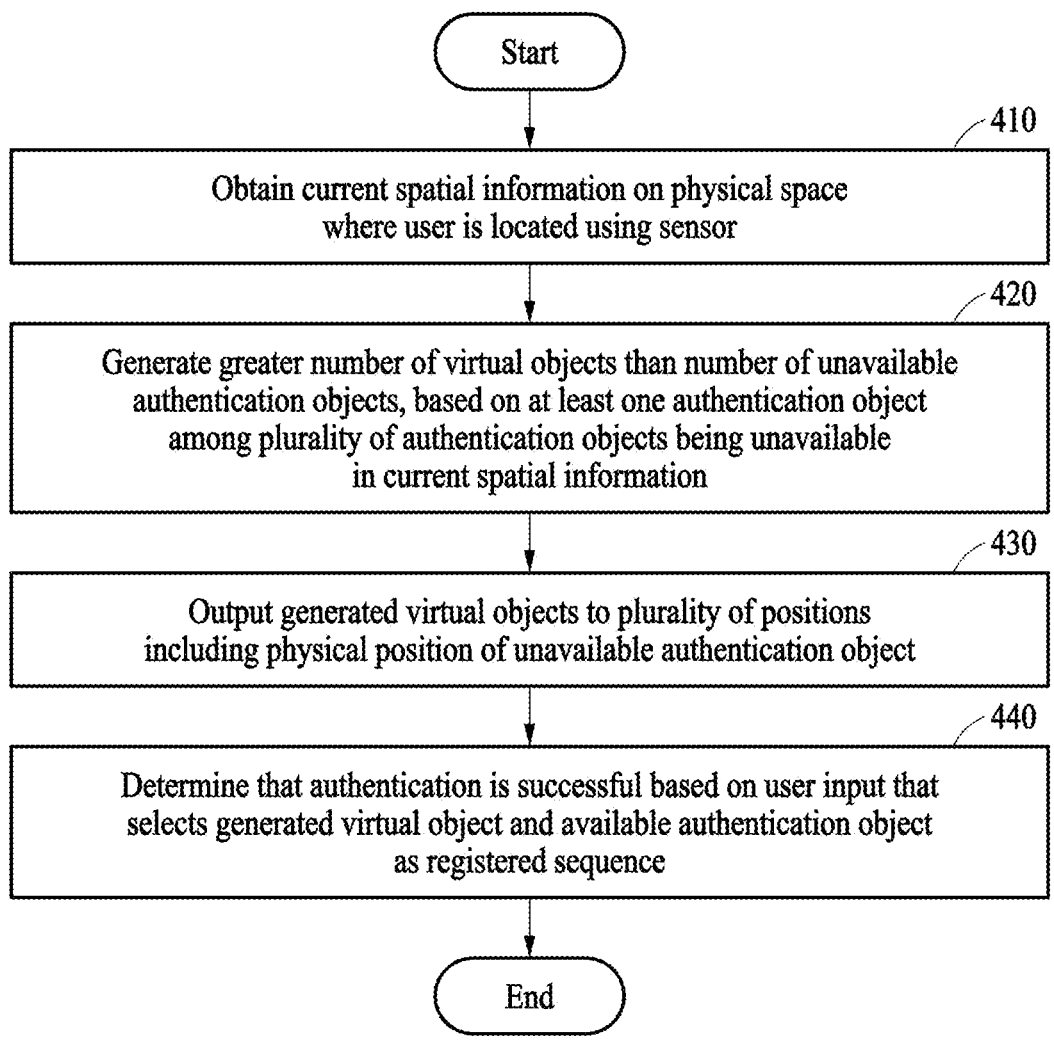
FIGS. 4 and 5 are flowcharts illustrating a user authentication method according to various embodiments of the disclosure.
Figure 5:
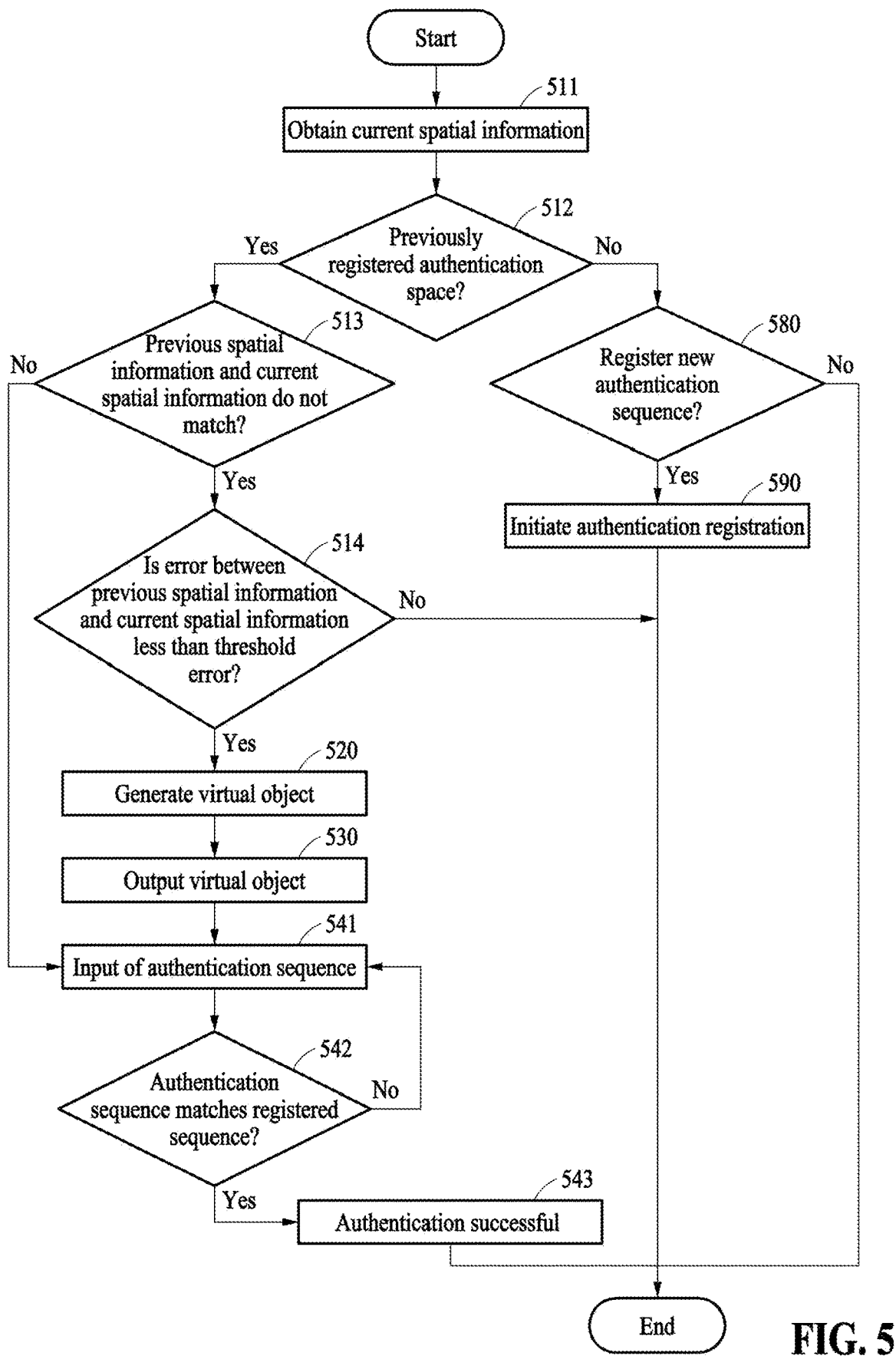

FIGS. 4 and 5 are flowcharts illustrating a user authentication method according to various embodiments of the disclosure.

In the following embodiments, operations may be performed sequentially, but not necessarily sequentially. For example, the order of the operations may change, and at least two of the operations may be performed in parallel.

FIG. 4 may show an operation flow when some of the authentication objects are unavailable.

Referring to FIG. 4, in operation 410, an electronic device (e.g., the electronic device 101 of FIG. 1) may obtain current spatial information on a physical space where a user is located using a sensor (e.g., the sensor module 176 of FIG. 1). The current spatial information may include a geographic location of a physical space where the user is located, a size of the space, a shape of the space, a position of a physical object placed in the space, a size of the physical object, and a shape of the physical object. For example, the current spatial information may be information on a portion of a physical space belonging to a scene within a sensing range (e.g., a field of view) of a sensor based on a direction the electronic device is currently facing from its current position. The sensor may collect information to provide augmented reality. For example, the sensor may include at least one of a camera, an infrared sensor, a depth sensor (e.g., a lidar sensor, a radar sensor, or a stereo camera), a gyro sensor, an acceleration sensor, or a geomagnetic sensor. The electronic device may detect a partial space within a field of view of the user and/or a field of view of the sensor and physical objects placed in the partial space based on a direction in which the user's head and/or the electronic device is facing in the physical space. The physical objects are described below with reference to FIG. 6.

When all authentication objects included in the authentication sequence that is registered in the current spatial information are available, the electronic device may receive an input for selecting an object in the space from the user. The authentication object may be an object registered for the aforementioned authentication and may be a physical object. The electronic device may generate and output a virtual object corresponding to a physical object in the space. The electronic device may overlay the virtual object on the physical object and output the virtual object through an AR display. A virtual object corresponding to a physical object may have the same or similar shape as the corresponding physical object, but is not limited thereto. For reference, embodiments of the disclosure mainly describe an example of replacing a physical object with a virtual object and outputting the virtual object, but the disclosure is not limited thereto. Instead of outputting a virtual object for a physical object, the electronic device may set a manipulation area in a space occupied by the physical object or a position corresponding to the physical object. The manipulation area may be set to have the same shape and volume as the space occupied by the physical object, but is not limited thereto. The electronic device may determine that the physical object corresponding to the selected manipulation area is selected by the user, based on detecting a user input for selecting the manipulation area.

In addition, a virtual object may include a physical object actually disposed in a physical space as well as a virtual object temporarily generated for authentication, which will be described later.

In operation 420, the electronic device may generate a greater number of virtual objects than the number of unavailable authentication objects, based on at least one authentication object among a plurality of authentication objects being unavailable in the current spatial information. The electronic device may generate a virtual object as a temporary object to replace an unavailable authentication object. The electronic device may prevent a third party using the electronic device from inferring an authentication object other than a legitimate user by generating and outputting a greater number of temporary objects than the number of unavailable authentication objects.

The electronic device may determine whether the corresponding authentication object is unavailable based on at least one of whether an object is detected, whether a state has changed, whether a position has changed, or whether a shape has changed. For example, the electronic device may determine at least one of an object out of a field of view of a sensor, an object out of a predetermined distance range from the electronic device, an object deformed from a registered state, an object moved from a registered position, or an undetected object among a plurality of authentication objects to be an unavailable authentication object. An object out of a field of view may be an object that is not detected from the sensing data of the sensor and may be an object that is out of the field of view or separated from the electronic device by a distance that is difficult to identify. An object out of a predetermined distance range may be an object separated from the electronic device by a threshold distance or more, or less than a minimum distance. The predetermined distance range may be a range representing a distance at which a selection input by a user is possible, and may be set to exclude objects that are too close or too far. An object deformed from a registered state may be an object in which a current state and a registered state are different. For example, when an object was a pot with a plant in the registered state but is a pot without the plant in the current state, the electronic device may determine that the state of the object has been deformed. An object moved from a registered position may be an object in which a registered position and a currently detected position are different.

In operation 430, the electronic device may output the generated virtual objects to a plurality of positions including a physical position of an unavailable authentication object. The electronic device may generate the virtual objects using a display providing augmented reality. The display may include at least one of an optical see-through display or a video see-through display. The optical see-through display may transmit light reflected from a physical object in the real world to the eyes of the user and provide image information generated based on the virtual object. In FIGS. 2 and 3, an example configuration of an optical see-through display has been described. The video see-through display may provide image information generated based on a physical object and a virtual object captured by a camera.

The electronic device may prevent speculation of an authentication object by a third party and ensure security by outputting a temporarily generated virtual object to another position as well as the position of the unavailable authentication object. The other position may include a position of another physical object within a physical space. The other position may include a randomly selected position within the physical space.

In operation 440, the electronic device may determine that authentication is successful based on a user input that selects the generated virtual object and an available authentication object as a registered sequence. For example, the electronic device may detect a user input that sequentially selects one or more objects from among the virtual objects output in operation 430. The user input will be described below with reference to FIG. 7. The electronic device may determine a sequence for selecting a virtual object and whether the selected virtual object matches a registered authentication sequence and a registered authentication object. The electronic device may determine that authentication is successful based on a sequence input by the user matching an authentication sequence. Based on the authentication being successful, the electronic device may allow access to at least one of information or a device related to at least one of the physical space or the electronic device.

The electronic device according to an embodiment may provide an AR environment to a user wearing a corresponding device (e.g., an AR device). The electronic device may augment a virtual space and a real space by naturally arranging a virtual object or virtual space in a real physical environment (e.g., a physical space). The electronic device may provide a user with a function to call and efficiently control the virtual space for various purposes such as work, leisure, and appreciation. The electronic device may provide a unique virtual space to the user and guarantee the privacy and security of the user by preventing access by a third party through the above-described authentication operation. In addition, the electronic device may determine whether control authority for the electronic device itself or a device connected to the electronic device is allowed through the above-described authentication operation.

The electronic device may identify an order (e.g., a sequence) for selecting a plurality of objects arranged in a space (e.g., a virtual space) by recognizing a user input including a gaze or a gesture (e.g., hand gesture) of the user, which will be described later. The electronic device may allow the control authority based on the sequential selection of registered authentication objects according to a predefined authentication sequence. Based on the detection of the unavailable authentication object as described above, the electronic device may provide a stable authentication operation to the user and prevent leakage of an authentication object to a third party by outputting a greater number of temporary virtual objects than the unavailable number (e.g., the number of unavailable authentication objects). Therefore, the electronic device may provide an authentication operation that is robust against changes including non-detection, deformation, or obscuration of a physical object included in previous spatial information.

FIG. 5 may show an operation flow of an authentication operation using a virtual object.

An electronic device (e.g., the electronic device 101 of FIG. 1) according to an embodiment may initiate an authentication operation for controlling and/or sharing a virtual space in a real space (e.g., a physical space).

Referring to FIG. 5, in operation 511, the electronic device may obtain current spatial information. The electronic device may obtain three-dimensional (3D) information about an actual physical space by recognizing the real space. The obtaining of the current spatial information will be further described below with reference to FIG. 6.

In operation 512, the electronic device may determine whether there is a previously registered authentication space in a space where a user is located. When there is no previously registered authentication space, in operation 580, the electronic device may determine whether to register a new authentication sequence. In operation 590, the electronic device may initiate authentication registration based on the determination to register a new authentication sequence based on a user input. The authentication registration will be further described below with reference to FIG. 11.

In operation 513, the electronic device may determine whether previous spatial information and current spatial information do not match. The electronic device may receive an authentication sequence from the user in operation 541 based on the previous spatial information matching the current spatial information.

In operation 514, the electronic device may determine whether an error between the previous spatial information and the current spatial information is less than a threshold error. For example, the electronic device may calculate an error (e.g., a spatial error) between spaces based on an object included in the previous spatial information and an object included in the current spatial information. The spatial error may be a ratio of the number of objects included in one piece of spatial information to the number of objects not detected in another piece of spatial information, but is not limited thereto. The electronic device may stop the authentication operation when an error between the spatial information is equal to or greater than the threshold error. In this case, the electronic device may proceed with the registration of a new authentication sequence or terminate the authentication operation. The electronic device may continue the authentication operation when the error between the spatial information is less than the threshold error.

In operation 520, the electronic device may generate a virtual object. For example, as described in relation to operation 420 of FIG. 4, the electronic device may generate a temporary virtual object to replace an unavailable authentication object. The electronic device may generate a greater number of virtual objects than the unavailable number in order to prevent leakage to a third party.

In operation 530, the electronic device may output a virtual object. For example, as described in relation to operation 430 of FIG. 4, the electronic device may output a virtual object corresponding to a physical object currently existing in the physical space.

In operation 541, the electronic device may receive an input of an authentication sequence from the user. The authentication sequence input may represent a user input for sequentially selecting a virtual object. For example, the electronic device may identify an authentication sequence according to a gaze of the user or an order of instruction.

For reference, when an authentication object is obscured due to a change in a position or a gaze direction of the user, the electronic device may provide a guide for the movement of the user position to induce matching of the user's gaze direction. For example, based on a current gaze direction of the user being different from a gaze direction registered when the authentication sequence is registered, the electronic device may output information guiding at least one of a position or posture in which an error between the current gaze direction and the registered gaze direction at the time of registration is less than a threshold error. The registered gaze direction may represent a gaze direction (e.g., a direction the electronic device faces or a direction eyes of the user gaze at) of the user in the previous spatial information (e.g., spatial information upon registration). The current gaze direction may represent a direction the user gazes at or a direction the electronic device faces in the current space. The electronic device may output information guiding at least one of a position or a direction in which an error between the current gaze direction and the registered gaze direction is reduced, to the user. Accordingly, the electronic device may enhance the convenience of inducing the user to input the authentication sequence in the same position and direction as at the time of registration.

The electronic device may determine the gaze direction based on at least one of sensing or head tracking of an eye tracking camera. For example, the electronic device may determine a direction in which the eyes of the user are gazing based on sensing data of the eye tracking camera. As another example, the electronic device may determine a heading direction of the electronic device based on head tracking and determine a gaze direction based on the heading direction of the electronic device. The heading direction of the electronic device may be, for example, a direction perpendicular to a corresponding one surface from the center of one surface (e.g., a front surface) of the electronic device, and the heading direction of the electronic device may be determined as the gaze direction. However, the determination of the gaze direction is not limited to the above-described example.

In addition, the electronic device may output guidance information for inducing a change from a current environment to a registered environment, based on the current environment in which authentication is being attempted being different from the registered environment when the authentication sequence is registered. For example, the electronic device may output information guiding an action to decrease a difference in illuminance, based on a difference between current illuminance and previous illuminance at the time of registration. For example, when the illuminance at the time of registration is higher than the current illuminance, the electronic device may guide the user to activate lighting in the current physical space. Accordingly, the electronic device may provide the convenience of inducing the user to perform authentication in the same environment as at the time of registration.

In operation 542, the electronic device may determine whether the input authentication sequence matches the registered authentication sequence. The electronic device may determine whether the user has selected each registered authentication object in the input authentication sequence according to the registered authentication sequence.

In operation 543, the electronic device may determine that authentication is successful when the authentication matches. The electronic device may determine that authentication is successful based on a selection sequence of a user for an authentication object provided to augmented reality through a display for current spatial information matching a pre-registered authentication pattern. The electronic device may store and terminate the authentication result. However, when the authentications do not match, the electronic device may terminate the authentication when the authentications do not match a predetermined number of times or more.

As described above, the electronic device according to an embodiment may provide an authentication operation using an object in a 3D space of a virtual space augmented in a real environment to a user wearing the corresponding device. The electronic device is intuitive and may provide information (e.g., an authentication sequence) that may be easily generated only by legitimate users with high security. Based on the above-described authentication operation, the electronic device may determine whether to grant control authority of a virtual space of a user, whether to allow control of the virtual space, or whether authorization has been authenticated in a case where a virtual space is shared such as when enjoying a space with other users or conducting collaborative work. The electronic device may analyze an actual space and compare the actual space with a previously registered space, to provide space authentication tailored to the user even when the space to be authenticated is partially different from the stored space.

Figure 6:
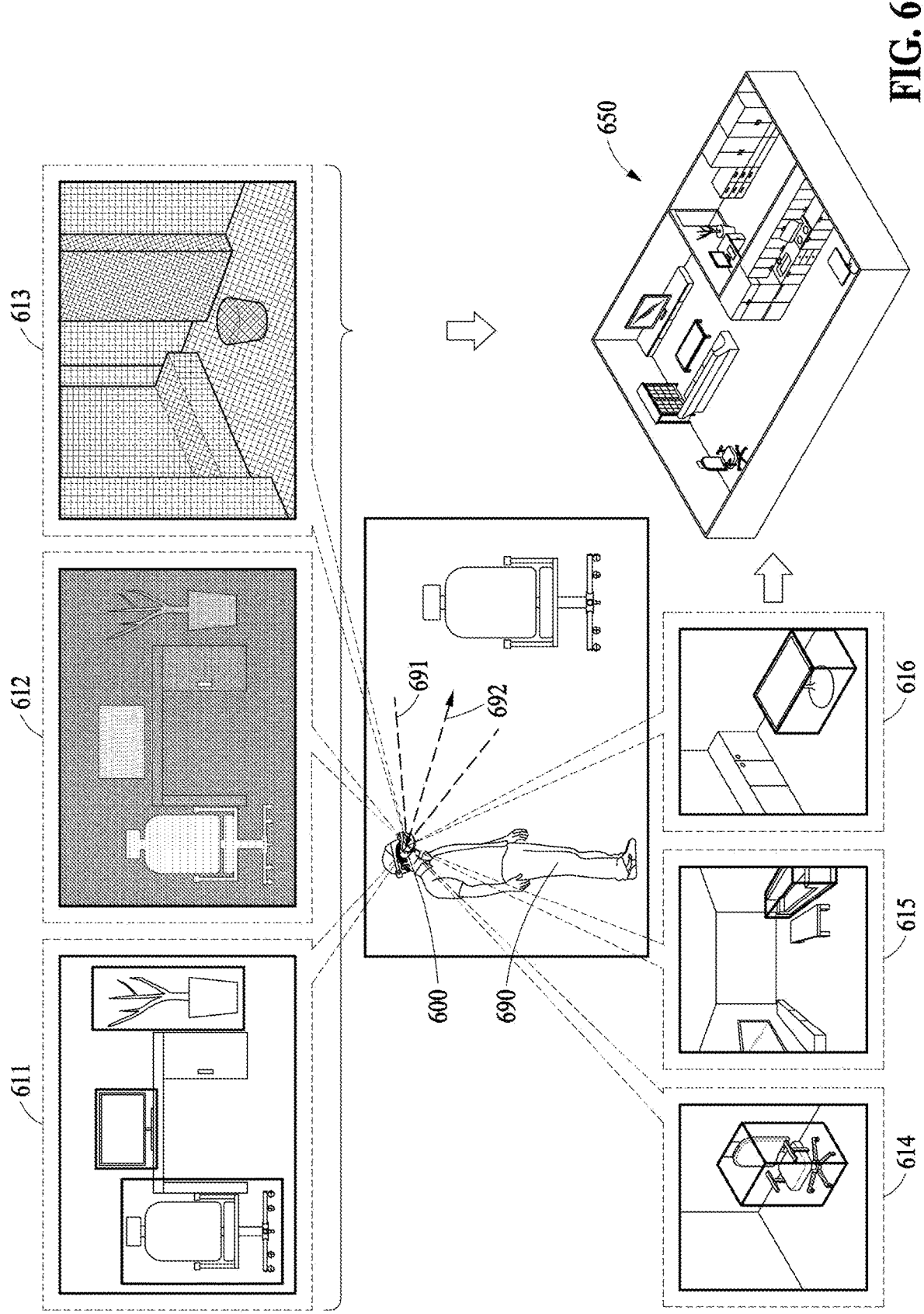
FIG. 6 is a diagram illustrating an example of obtaining current spatial information according to an embodiment of the disclosure.

FIG. 6 is a diagram illustrating an example of obtaining current spatial information according to an embodiment of the disclosure.

Referring to FIG. 6, an electronic device 600 (e.g., the electronic device 101 of FIG. 1) according to an embodiment may analyze a physical space as 3D information by using various input signals (e.g., sensing data of an RGB camera, infrared sensor, depth sensor, or stereo camera) of sensors. For example, the electronic device 600 may analyze at least one of a shape, size, or position of a physical space, or a shape, size, or position of a physical object.

The electronic device 600 may detect an object captured in a scene corresponding to a field of view 691 of a camera using sensing data (e.g., a captured image) of the camera. The electronic device 600 may determine a label (e.g., information indicating the classification of an object, including a value indicating a chair, monitor, or plant) of a physical object and an area (e.g., a bounding box) occupied by the physical object within a two-dimensional (2D) scene from a 2D scene image of the camera. Accordingly, the electronic device 600 may obtain 2D scene information 611 from a position where a user 690 is looking. In addition, the electronic device 600 may calculate a position of the electronic device 600 in a physical space based on sensing data of the camera.

The electronic device 600 may obtain position information of the user 690 and depth information 612 of a real space in a viewing direction using sensing data (e.g., depth data) of a depth sensor. The depth information 612 may be information indicating a distance from the depth sensor to each point and may be expressed in the shape of a depth map. The electronic device 600 may analyze a distance of each pixel unit from a 3D position viewed by the user 690.

The electronic device 600 may obtain information 613 including a 3D point cloud and a mesh using various sensing data. The electronic device 600 may obtain a plane, a mesh, or a 3D coordinate point cluster included in a space by analyzing the physical space. The electronic device 600 may obtain a 3D point cloud representing physical objects based on the information obtained as described above.

The electronic device 600 may analyze the physical space and obtain information 614, 615, 616 including at least one of 3D position coordinates, a 3D shape, or 3D size (e.g., a 3D bounding box) of the physical objects arranged in the physical space. Accordingly, the electronic device 600 may obtain object detection information and semantic segmentation information of the 3D space.

As described above, the electronic device 600 may obtain and store 3D information (e.g., spatial information) on a physical object and a physical space. The electronic device 600 may store 3D position information in a space of the user 690 together with the spatial information. The electronic device 600 may store 3D spatial information 650 upon registration.

When an authentication operation is performed, the electronic device 600 may compare current spatial information with previous spatial information. The current spatial information and previous spatial information may be stored as the 3D spatial information 650 as shown in FIG. 6. The electronic device 600 may calculate similarity information based on the comparison between the current spatial information and previous spatial information. For example, the electronic device 600 may also calculate a similarity between the stored previous spatial information and current spatial information as a ratio between 0% and 100%, but the example is not limited thereto. The electronic device 600 may correct and compare position information of the user 690 of the previous spatial information with position information of the user 690 of the current spatial information. As described above, when the position and gaze direction 692 of the user 690 in the previous spatial information and the current spatial information are different, the electronic device 600 may provide guidance to the user 690 to take the same or similar position and gaze direction 692 as the previous spatial information. The electronic device 600 may provide an authentication operation that is robust against various position changes of the user 690 in the same real space.

Figure 7:
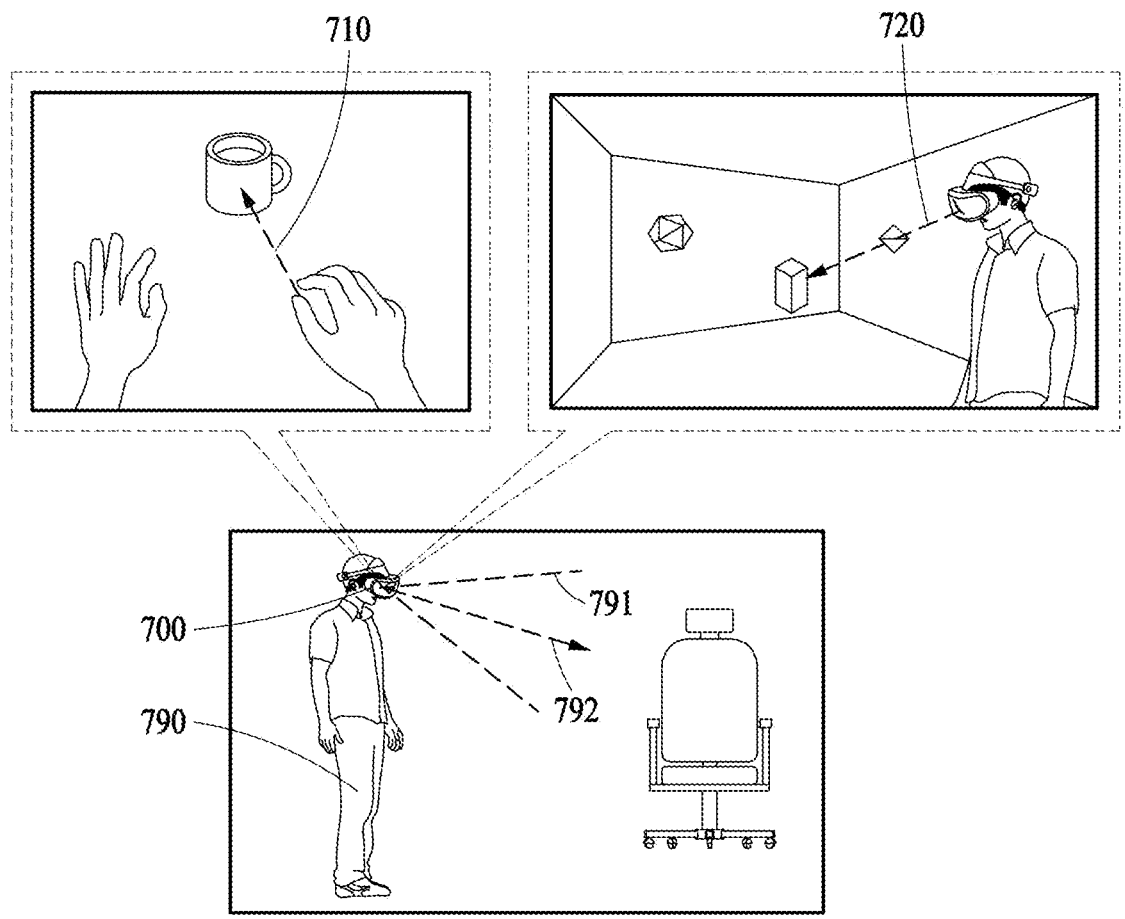
FIG. 7 is a diagram illustrating an operation of selecting an authentication object according to an embodiment of the disclosure.

FIG. 7 is a diagram illustrating an operation of selecting an authentication object according to an embodiment of the disclosure.

Referring to FIG. 7, an electronic device 700 (e.g., the electronic device 101 of FIG. 1) according to an embodiment may identify at least one of a gaze direction 792 or a gesture of a user 790 using a sensor. The electronic device 700 may detect the selection of virtual objects within a field of view 791 of the sensor. For example, the electronic device 700 may determine that a corresponding virtual object is selected based on detecting an action 720 of gazing at the virtual object for a predetermined time or more through eye gaze tracking technology. The electronic device 700 may recognize a gesture pointing to the virtual object through hand tracking technology. The electronic device 700 may determine that the corresponding virtual object is selected when a direction 710 in which a tracked hand is pointing points to the virtual object for a predetermined time or more, or the hand of the user 790 contacts or enters an area occupied by the virtual object in the virtual space.

Accordingly, the electronic device may identify an authentication sequence input by the user based on an order in which the eyes of the user gaze or the hand of the user points to the authentication object.

Figure 8:
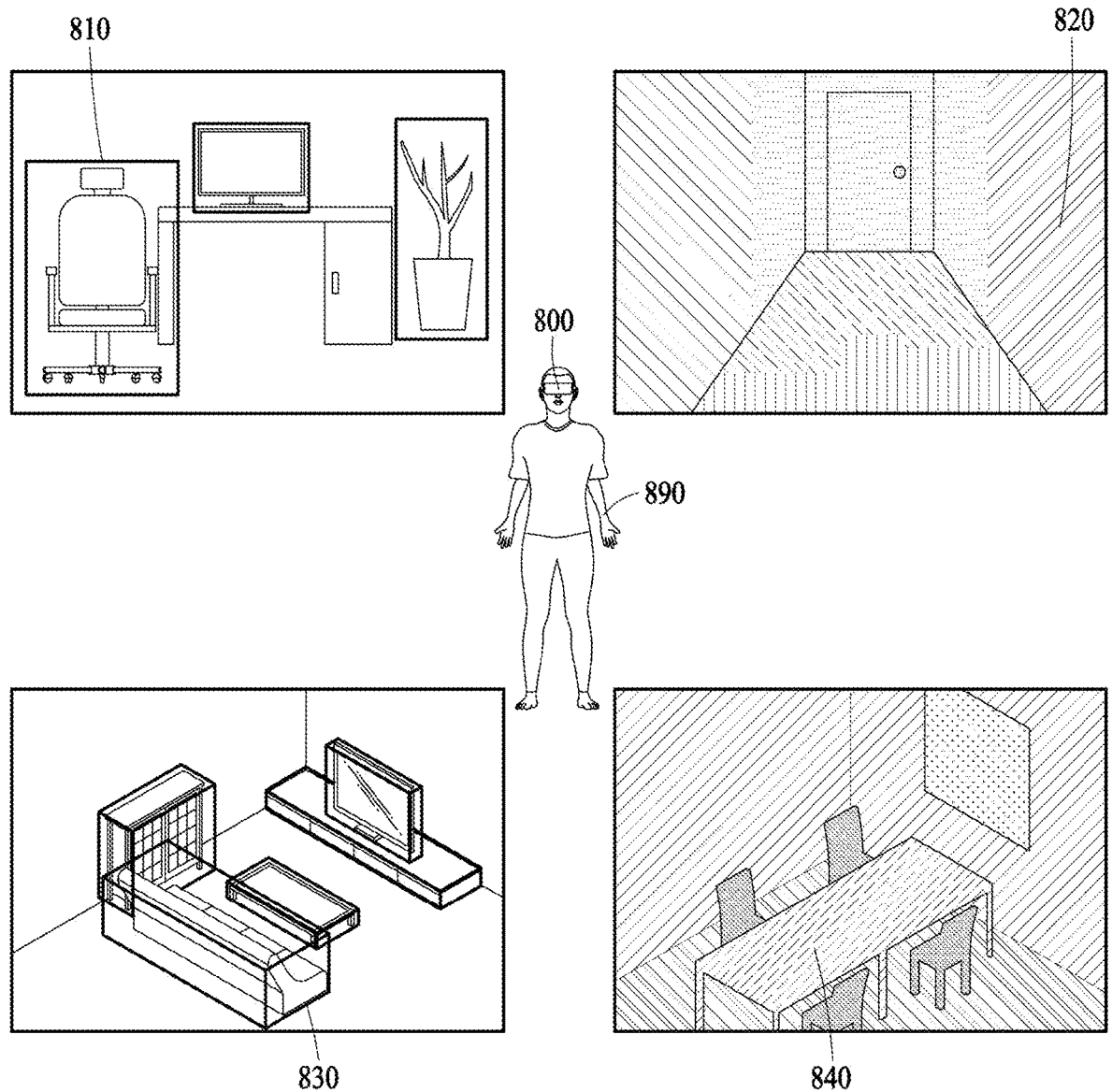
FIG. 8 is a diagram illustrating types of authentication objects according to an embodiment of the disclosure.

FIG. 8 is a diagram illustrating types of authentication objects according to an embodiment of the disclosure.

Referring to FIG. 8, an electronic device 800 (e.g., the electronic device 101 of FIG. 1) according to an embodiment may generate a virtual object corresponding to a real physical object or a temporary object. As described above, the electronic device 800 may generate a virtual object based on a result of analyzing a physical space in reality. In an AR environment, the virtual object may have a 3D shape similar to a real environment or a 3D shape that a user 890 may easily distinguish and perceive with the eyes. The electronic device 800 may generate a virtual object that is selectable according to an instruction based on a gaze or gesture of the user 890.

For example, the electronic device 800 may generate the virtual object using a 2D object 810 in 2D scene information of a position (e.g., a gaze direction and position of the user 890) where the user 890 is looking within a sensing range of a sensor. The electronic device 800 may generate a 2D image object as a virtual object in a virtual space and may provide a reduced or enlarged 2D image object. A size of the 2D image object may vary according to a preference of the user 890.

The electronic device 800 may generate a virtual object 820 corresponding to a virtual plane at the same position as a real physical environment. For example, the electronic device 800 may generate a virtual object having a shape corresponding to a floor or wall which has a surface shape in the real environment.

The electronic device 800 may provide a 3D virtual object 830 at the same position as the real environment. In FIG. 8, the 3D virtual object 830 is shown in the form of a 3D bounding box displayed at a position where a physical object in a real environment is arranged. For example, the electronic device 800 may arrange a virtual object at 3D position coordinates of the physical object in the real environment.

The electronic device 800 may provide a 3D virtual object 840 having the same position and size as the real environment. In FIG. 8, the 3D virtual object 840 is shown as a virtual object having the same shape and size as a physical object, determined based on segmentation of a 3D scene. However, the embodiment is not limited thereto. As described above, a manipulation area smaller than that of the physical object may be set for a virtual object based on a physical object.

The electronic device 800 may provide virtual objects of various object types shown in FIG. 8 in an authentication operation. The electronic device 800 may output virtual objects including authentication objects, temporary objects, and objects corresponding to other physical objects not registered for authentication at a plurality of positions.

Figure 9:
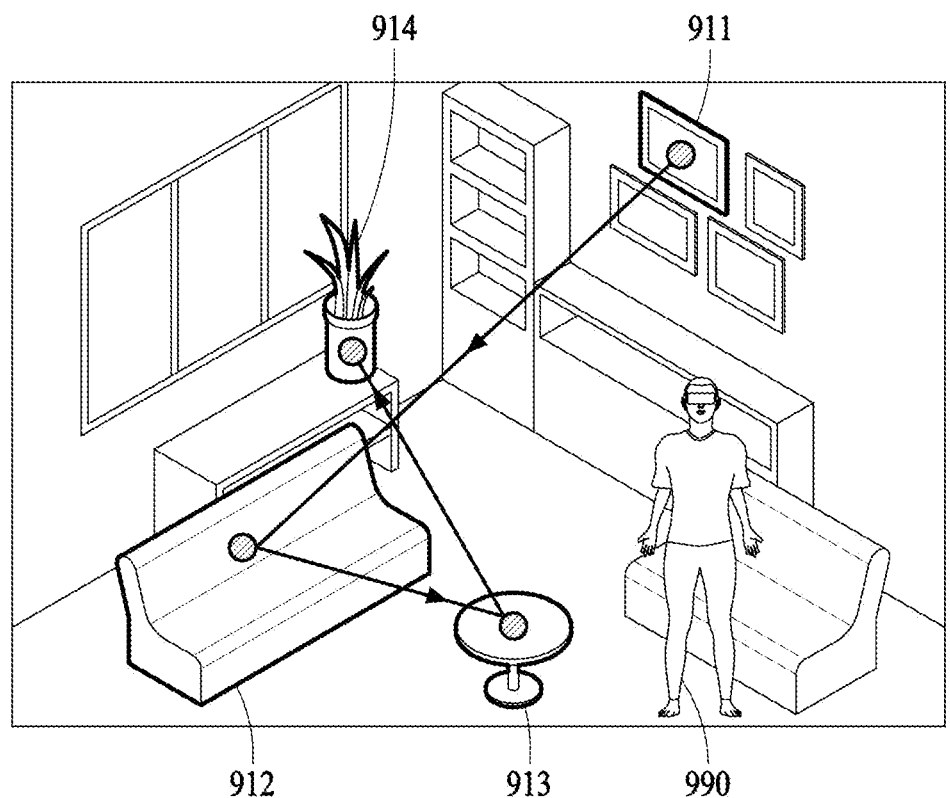
FIG. 9 is a diagram illustrating an operation of selecting an authentication object according to an authentication sequence according to an embodiment of the disclosure.

FIG. 9 is a diagram illustrating an operation of selecting an authentication object according to an authentication sequence according to an embodiment of the disclosure.

Referring to FIG. 9, an electronic device (e.g., the electronic device 101 of FIG. 1) according to an embodiment may detect a user input for selecting one or more virtual objects among a plurality of virtual objects 911, 912, 913, and 914 arranged in a space. As described above with reference to FIG. 7, a user input by a user 990 may be an input indicating a virtual object. The electronic device 900 may reproduce a virtual space by combining the virtual space with a physical space. In addition, the electronic device 900 may reproduce the plurality of virtual objects 911, 912, 913, and 914 by combining them with a virtual space and/or a physical space. For example, the electronic device 900 may arrange and output the plurality of virtual objects 911, 912, 913, and 914 at corresponding positions. The electronic device 900 may apply a motion or an animation effect to the virtual space and the plurality of virtual objects 911, 912, 913, and 914.

The electronic device 900 may detect a user input for sequentially selecting the plurality of virtual objects 911, 912, 913, and 914 arranged in the virtual space for authentication. The electronic device 900 may determine whether an order of selecting the plurality of virtual objects 911, 912, 913, and 914 matches a registered authentication sequence. Hereinafter, an example in which some of the authentication objects included in the registered authentication sequence are unavailable is described with reference to FIG. 10.

Figure 10:
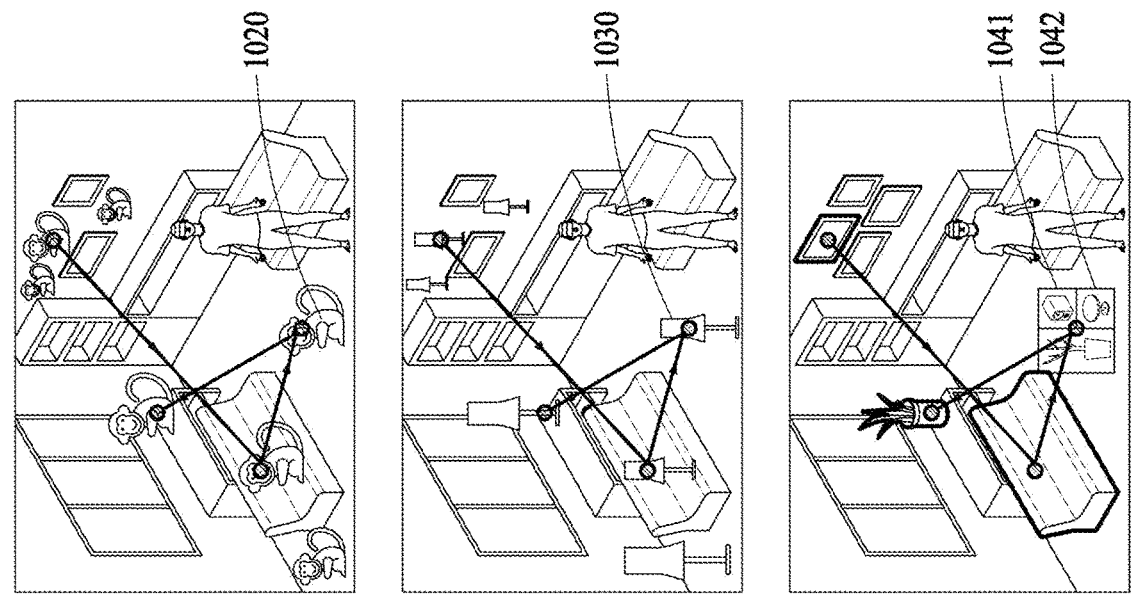
FIG. 10 is a diagram illustrating the generation of a virtual object when some authentication objects are unavailable according to an embodiment of the disclosure.

FIG. 10 is a diagram illustrating the generation of a virtual object when some authentication objects are unavailable according to an embodiment of the disclosure.

Referring to FIG. 10, an electronic device (e.g., the electronic device 101 of FIG. 1) according to an embodiment may perform authentication even when some authentication objects are unavailable. Examples of when some authentication objects are unavailable may include, when a physical object is gone, when the physical object is deformed and changed, when the physical object is not visible from a visibility of a user, or when a current space is different from a previously stored space. The electronic device may automatically reconstruct a space or provide a virtual object that replaces a real object to a user. The electronic device may also recommend registration of a new authentication sequence, which will be described later.

For example, the electronic device may generate virtual objects in a shape different from an unavailable authentication object 1010. The electronic device may generate the virtual objects in at least one of a default shape predetermined by a user or a shape of a physical object detected within a sensing range of a sensor. As shown in FIG. 10, the electronic device may output virtual objects 1020 having a monkey shape as a predetermined default shape to a virtual space. The electronic device may output virtual objects 1030 having lamp shapes as shapes of physical objects detected in the physical space to the virtual space. The electronic device may prevent security leakage to a third party by arranging the virtual objects 1020 at positions of registered authentication objects as well as at positions of other physical objects in the physical space. The electronic device may generate at least one virtual object among virtual objects in the same shape as another virtual object. For reference, an example in which all of the virtual objects 1020 and 1030 have the same shape is illustrated.

In addition, the electronic device may generate at least one virtual object as an object having at least one of a ratio or a size different from that of another virtual object while having the same shape as the other virtual object. According to an embodiment of the disclosure, a shape may represent an appearance independent of size or proportion. FIG. 10 shows an example in which the virtual objects 1020 and 1030 having different ratios and sizes of a monkey shape and a lamp shape are output.

However, the example is not limited to the foregoing, and the electronic device may randomly select the shapes of virtual objects. The electronic device may generate at least one virtual object among virtual objects in a shape different from another virtual object. For example, a virtual object 1041 having a different shape from the rest may be arranged in place of the unavailable authentication object 1010. Also, a virtual object 1042 having the same shape as the unavailable authentication object 1010 may be arranged.

The electronic device may arrange at least one virtual object among virtual objects at the same position as a currently available authentication object. The electronic device may determine at least some positions among a plurality of positions where the virtual objects are output as positions of a physical object detected in a field of view of a sensor in a current place of the electronic device. Accordingly, the plurality of positions where the virtual objects are output may include not only a position of the unavailable authentication object 1010 and a position where the currently available authentication object is arranged, but also a position of a physical object not included in the registered authentication sequence. The electronic device may overlay and output an object arranged at a position of a currently available authentication object among virtual objects on the currently available authentication object. The electronic device may also overlay and output the virtual object on another physical object existing in the current space.

When some of the authentication objects are unavailable, the electronic device according to an embodiment may provide a virtual object having a shape different from a previously registered authentication object to secure a registered authentication sequence. In this case, a virtual object having the same shape may be overlaid and output at a position of a physical object included in the registered authentication sequence or at a position of another physical object not included in the authentication sequence. By outputting a virtual object to a position of the unavailable authentication object 1010, a position of the available authentication object, and a position of another physical object, the electronic device may provide authentication services to legitimate users and prevent security leakage to third parties.

In addition, the electronic device may limit the output of virtual objects at a position of a physical object that is out of at least one of a predetermined size range or a distance range predetermined by the electronic device from among physical objects detected in the field of view of the sensor. The predetermined size range may be a range between a minimum size and a maximum size and may be determined based on at least one of a user's manipulation convenience or object visibility. The minimum size may be determined as the size of the unavailable authentication object 1010, for example. Positions of physical objects that are too large or too small may be excluded. When there is a bookshelf in the current space, inconvenience in manipulation that may be caused when virtual objects are displayed on all the books may be prevented. The predetermined distance range may be a range between a minimum distance and a maximum distance and may be determined based on at least one of a user's manipulation convenience or object visibility. Positions of physical objects that are too close or too far may be excluded. Inconvenience in manipulation that may be caused when a virtual object is displayed at a position that is too far away (that is, a situation where it is difficult for a user to select a virtual object displayed at a position that is too far away) may be prevented.

As described above, the electronic device according to an embodiment may output a virtual object having a default shape or a virtual object obtained by copying a shape identical to a physical object within a field of view of a sensor. The electronic device may generate a mixture of virtual objects having a shape unrelated to the registered authentication sequence or a shape related to the authentication sequence. The electronic device may enhance security by replacing and outputting the unavailable authentication object 1010 with a plurality of virtual objects having the above-described shapes.

Figure 11:
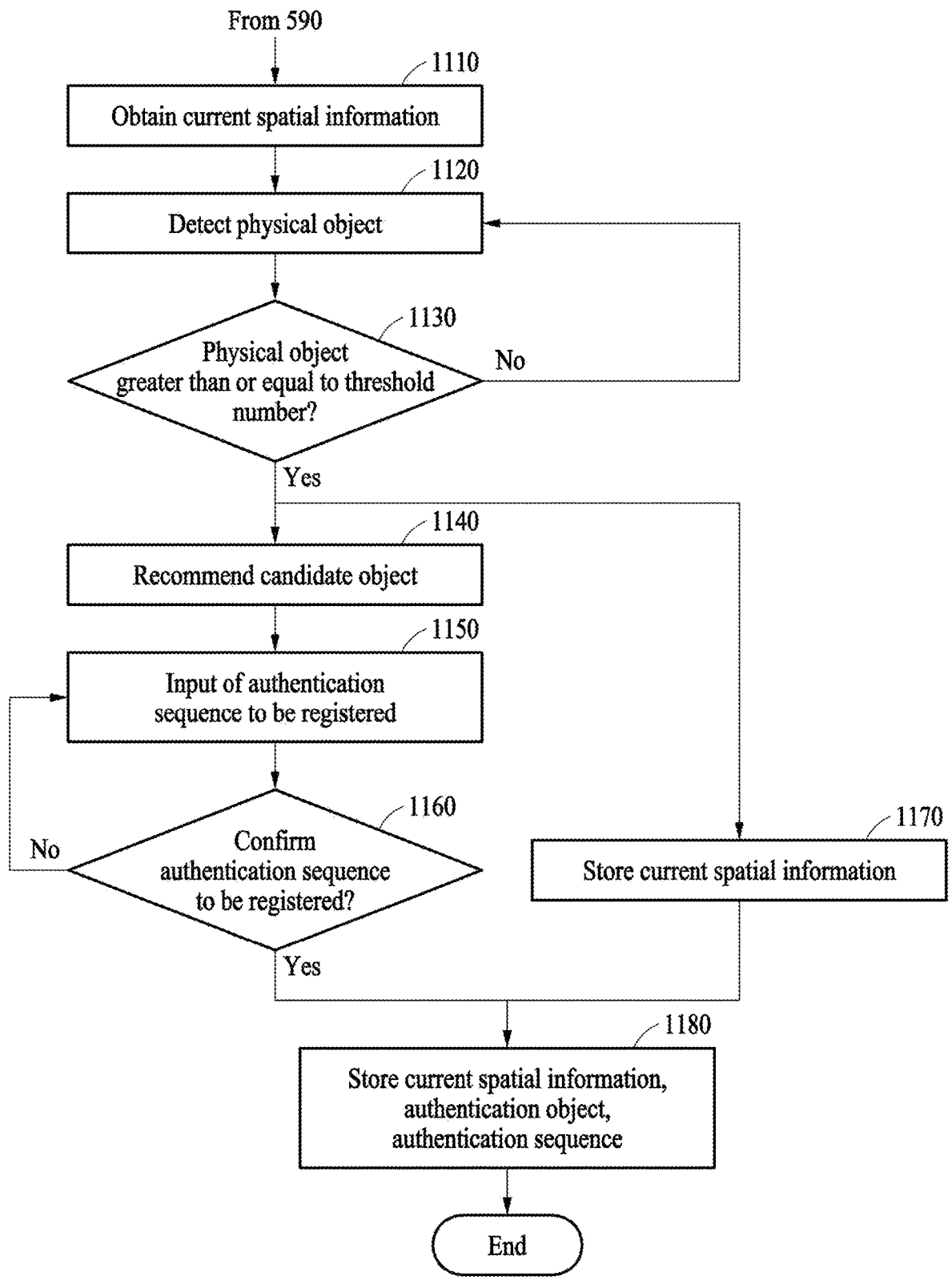
FIG. 11 is a flowchart illustrating an operation of registering a new authentication sequence according to an embodiment of the disclosure.

FIG. 11 is a flowchart illustrating an operation of registering a new authentication sequence according to an embodiment of the disclosure.

Referring to FIG. 11, an electronic device (e.g., the electronic device 101 of FIG. 1) according to an embodiment may recommend an object to be used for authentication to a user based on current spatial information when an authentication sequence is registered. The electronic device may initiate an operation of registering and/or updating a new authentication sequence from operation 590 described above with reference to FIG. 5. For example, the electronic device may initiate an operation for registering a new authentication sequence based on the user authentication being successful as described above with reference to FIGS. 4 and 5. However, the example is not limited thereto, and the electronic device may initiate an operation for registering a new authentication sequence based on determining a legitimate user for a space subject to user authentication through various methods (e.g., authentication based on a personal identification number (PIN) input, authentication based on biometric information including fingerprint and face). In addition, along with the above-described successful user authentication, the electronic device may perform an operation for updating an authentication sequence based on detecting a changed portion by comparing pre-registered previous spatial information with current spatial information.

In operation 1110, the electronic device may obtain current spatial information. The electronic device may obtain 3D information on a size and shape of a current space and a size and shape of a physical object within the current space. Since obtaining of the spatial information has been described above, a further description is omitted.

In operation 1120, the electronic device may detect a physical object in the current space. The electronic device may generate a virtual object based on the detected physical object. The electronic device may overlay and output a 3D virtual object individually corresponding to each of a plurality of the detected physical objects. The electronic device may reproduce the virtual object by arranging the virtual object at a corresponding position and applying a motion effect.

In operation 1130, the electronic device may determine whether the number of physical objects is greater than or equal to a threshold number. For example, the electronic device may determine whether virtual objects are generated for N or more physical objects. In this example, N may be an integer greater than or equal to 2. The electronic device may retry detection of the physical object in operation 1120 based on the number of the generated virtual objects being less than or equal to the threshold number.

In operation 1140, the electronic device may recommend a candidate object. The electronic device may recommend M candidate objects among the generated N virtual objects. M may be an integer greater than or equal to 1 and less than or equal to N. When previous spatial information exists, the electronic device may determine a candidate object based on a comparison between the previous spatial information and the current spatial information. The electronic device may recommend a candidate object using a changed portion of the current spatial information from the previous spatial information, based on a spatial error between the previous spatial information and the current spatial information being less than a threshold error. For example, the electronic device may present one or more recommended objects to be used for authentication based on the changed portion of the current spatial information from the registered previous spatial information. The electronic device may determine a physical object corresponding to the changed portion to be the recommended object. Accordingly, the electronic device may induce the changed portion to be included in the authentication sequence.

In addition, the electronic device may recommend a target device as a candidate object based on registering an authentication sequence for accessing the target device to be controlled. Accordingly, the electronic device may register an authentication sequence intuitively mapped to a control target.

Based on registering the authentication sequence, the electronic device may recommend, as a candidate object for the authentication sequence, a physical object belonging to an object type determined based on a preference of a user among spatial information corresponding to a physical space where the user is positioned. For example, when the user is a reader and a book is an object type preferred by the user, the electronic device may preferentially recommend a virtual object corresponding to the book as a candidate object. The electronic device may intuitively guide the user that the object is the recommended object by reproducing the M candidate objects by applying at least one of a motion or an animation effect to the recommended M candidate objects.

In operation 1150, the electronic device may receive an input of an authentication sequence to be registered. The electronic device may store an order of virtual objects sequentially selected by the user. As described above, the electronic device may determine whether a virtual object has been selected based on at least one of eye tracking or hand tracking.

In operation 1160, the electronic device may determine whether to confirm the authentication sequence to be registered. The electronic device may determine whether the same authentication sequence is repeatedly inputted by the user T or more times. T may be an integer greater than or equal to 1.

In operation 1170, the electronic device may store current spatial information based on the generating of enough virtual objects to register a new authentication sequence.

In operation 1180, the electronic device may store the current spatial information, the authentication object, and the authentication sequence based on confirming that the user inputs the same authentication sequence. The electronic device may group and store the current spatial information, the authentication object, and the authentication sequence. The electronic device may store a selected object as an authentication object and register a selected order as an authentication sequence. Accordingly, the electronic device may update the authentication object and the authentication sequence based on objects selected by the user from among candidate objects including one or more recommended object and a sequence in which the objects are selected. For reference, an authentication sequence according to an embodiment of the disclosure may also be referred to as an authentication pattern.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display circuit configured to provide augmented reality;
a sensor configured to collect information for providing the augmented reality;
a processor; and
memory storing instructions that when executed by the processor cause the electronic device to:
obtain current spatial information on a physical space where a user is positioned using the sensor,
determine that at least one authentication object in the current spatial information is unavailable in the physical space, based on one of an absence of the at least one authentication object in the physical space, a change in state of the at least one authentication object, a change in position of the at least one authentication object, a position of the at least one authentication object out of a field of view of the sensor, or a distance of the at least one authentication object from the electronic device,
generate a first number of virtual objects, wherein the first number is greater than a second number of the unavailable authentication objects,
output the generated virtual objects to a plurality of positions comprising a physical position of the unavailable authentication object, and
determine that authentication is successful based on a user input that selects a generated virtual object and an available authentication object as a registered sequence.

2. The electronic device of claim 1, wherein, the instructions, when executed by the processor, further cause the electronic device to:
generate the virtual objects in a shape different from the unavailable authentication object.

3. The electronic device of claim 1, wherein the instructions, when executed by the processor, further cause the electronic device to:
generate the virtual objects in at least one of a default shape predetermined by a user or a shape of a physical object detected within a sensing range of the sensor.

4. The electronic device of claim 1, wherein the instructions, when executed by the processor, further cause the electronic device to:
generate at least one virtual object among the virtual objects in the same shape as another virtual object.

5. The electronic device of claim 4, wherein the instructions, when executed by the processor, further cause the electronic device to:
generate the at least one virtual object as an object having at least one of a ratio or a size different from that of the other virtual object while having the same shape as the other virtual object.

6. The electronic device claim 1, wherein the instructions, when executed by the processor, further cause the electronic device to:
randomly select shapes of the virtual objects, and
generate at least one virtual object among the virtual objects in a shape different from another virtual object.

7. The electronic device of claim 1, wherein the instructions, when executed by the processor, further cause the electronic device to:
arrange at least one virtual object among the virtual objects at the same position as a currently available authentication object.

8. The electronic device of claim 1, wherein the instructions, when executed by the processor, further cause the electronic device to:
overlay and output an object arranged at a position of a currently available authentication object among the virtual objects on the currently available authentication object.

9. The electronic device of claim 1, wherein the instructions, when executed by the processor, further cause the electronic device to:
determine at least some positions among a plurality of positions where the virtual objects are output as positions of a physical object detected in a field of view of the sensor in a current place of the electronic device.

10. The electronic device of claim 1, wherein the instructions, when executed by the processor, further cause the electronic device to:
limit output of the virtual objects at a position of a physical object that is out of at least one of a predetermined size range or a distance range predetermined by the electronic device from among physical objects detected in a field of view of the sensor.

11. The electronic device of claim 1, wherein the instructions, when executed by the processor, further cause the electronic device to:
based on a current gaze direction of the user being different from a gaze direction registered when an authentication sequence is registered, output information guiding at least one of a position or a posture in which an error between the current gaze direction and the registered gaze direction at a time of registration is less than a threshold error.

12. The electronic device of claim 1, wherein the instructions, when executed by the processor, further cause the electronic device to:
output guidance information for inducing a change from a current environment to a registered environment, based on the current environment in which authentication is being attempted being different from the registered environment when an authentication sequence is registered.

13. The electronic device of claim 1, wherein the instructions, when executed by the processor, further cause the electronic device to:
recommend a target device as a candidate object based on registering an authentication sequence for accessing the target device to be controlled.

14. The electronic device of claim 13, wherein the instructions, when executed by the processor, further cause the electronic device to:
based on registering the authentication sequence, recommend, as a candidate object for the authentication sequence, a physical object belonging to an object type determined based on a preference of the user among spatial information corresponding to a physical space where the user is positioned.

15. The electronic device of claim 1, wherein the display circuit comprises:
an optical see-through display circuit configured to transmit light reflected from a physical object in the real world to eyes of the user and provide image information generated based on a virtual object, and
a video see-through display circuit configured to provide image information generated based on the physical object and virtual object captured by a camera.

16. The electronic device of claim 1, wherein the instructions, when executed by the processor, further cause the electronic device to:
perform an operation for updating an authentication sequence based on detecting a changed portion by comparing pre-registered previous spatial information with the current spatial information.

17. The electronic device of claim 16, wherein the instructions, when executed by the processor, further cause the electronic device to:
present one or more recommended objects to be used for authentication based on the changed portion of the current spatial information from the pre-registered previous spatial information, and
update an authentication object and an authentication sequence based on objects selected by the user from among candidate objects comprising the one or more recommended objects and a sequence in which the objects are selected.

18. A method implemented by a processor, the method comprising:
obtaining current spatial information on a physical space where a user is positioned using a sensor configured to collect information for providing augmented reality;
determining that at least one authentication object in the current spatial information is unavailable in the physical space, based on one of an absence of the at least one authentication object in the physical space, a change in state of the at least one authentication object, a change in position of the at least one authentication object, a position of the at least one authentication object out of a field of view of the sensor, or a distance of the at least one authentication object from an electronic device;
generating a first number of virtual objects, wherein the first number is greater than a second number of the unavailable authentication objects;
outputting the generated virtual objects to a plurality of positions comprising a physical position of the unavailable authentication object using a display circuit configured to provide the augmented reality; and
determining that authentication is successful based on a user input that selects a generated virtual object, of the generated virtual objects, and an available authentication object as a registered sequence.

* * * * *